(12) United States Patent
Jain et al.

(10) Patent No.: US 12,207,356 B2
(45) Date of Patent: Jan. 21, 2025

(54) USER EQUIPMENT CAPABILITY SEGMENTATION

(71) Applicant: QUALCOMM Incorporated, San Diego, CA (US)

(72) Inventors: Hitesh Jain, Udaipur (IN); Sarath Kumar Pujari, Hyderabad (IN); Ansah Ahmed Sheik, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 637 days.

(21) Appl. No.: 17/305,998

(22) Filed: Jul. 19, 2021

(65) Prior Publication Data

US 2023/0013218 A1 Jan. 19, 2023

(51) Int. Cl.
*H04W 8/24* (2009.01)
*H04L 1/08* (2006.01)
*H04L 1/1812* (2023.01)
*H04L 5/00* (2006.01)

(52) U.S. Cl.
CPC ............... *H04W 8/24* (2013.01); *H04L 1/08* (2013.01); *H04L 1/1812* (2013.01); *H04L 5/0055* (2013.01)

(58) Field of Classification Search
CPC ................................ H04L 1/08; H04L 1/1812
See application file for complete search history.

(56) References Cited

U.S. PATENT DOCUMENTS

| 2011/0019756 | A1* | 1/2011 | Chun | H04L 1/1685 455/509 |
| 2012/0129530 | A1* | 5/2012 | Larmo | H04W 36/02 455/436 |
| 2019/0208541 | A1 | 7/2019 | Lee et al. | |
| 2019/0253921 | A1* | 8/2019 | Shin | H04L 1/12 |

(Continued)

FOREIGN PATENT DOCUMENTS

WO WO-2019006945 A1 * 1/2019

OTHER PUBLICATIONS

Ericsson: "On Scheduling, HARQ, and DRX for NTNs", R2-2103950, 3GPP TSG-RAN WG2 #113bis-e, 3rd Generation Partnership Project (3GPP), Mobile Competence Centre, 650, Route Des Lucioles, F-06921 Sophia-Antipolis Cedex, France, vol. RAN WG2, No. E-Meeting, Apr. 12, 2021, Apr. 1, 2021, XP051992321, 27 Pages, p. 12.

(Continued)

*Primary Examiner* — Gary Mu
*Assistant Examiner* — Yewon Kim
(74) *Attorney, Agent, or Firm* — Harrity & Harrity, LLP

(57) ABSTRACT

Some aspects described herein relate to reducing a delay in the retransmission of undelivered capability information segments. For example, when transmitting capability information via multiple segments, a UE may request the network to acknowledge each segment and/or may modify a network configured parameter to reduce the delay in retransmitting undelivered segments. In some aspects, a UE may attach to a network for a priority service, such as an emergency (Continued)

service or a short message service. In connection with the attachment, the UE may provide a reduced set of capability information that is relevant to the priority service and that omits at least some capability information irrelevant to the priority service.

28 Claims, 10 Drawing Sheets

(56) References Cited

U.S. PATENT DOCUMENTS

| | | | |
|---|---|---|---|
| 2020/0022212 A1* | 1/2020 | Eda | H04L 1/1832 |
| 2020/0107394 A1* | 4/2020 | Lee | H04L 69/321 |
| 2022/0173837 A1* | 6/2022 | Kainulainen | H04L 1/1829 |
| 2022/0217583 A1* | 7/2022 | Jin | H04W 8/24 |
| 2022/0256376 A1* | 8/2022 | Tugnawat | H04W 24/06 |

OTHER PUBLICATIONS

International Search Report and Written Opinion—PCT/US2022/072952—ISA/EPO—Dec. 8, 2022.
Partial International Search Report—PCT/US2022/072952—ISA/EPO—Oct. 17, 2022.
Qualcomm Incorporated: "Classification of Radio Configuration Parameters in Draft 32.592", 3GPP TSG-SA5 (Telecom Management) SA5 Meeting #69, S5-100160, 3rd Generation Partnership Project (3GPP), Mobile Competence Centre, 650, Route Des Lucioles, F-06921 Sophia-Antipolis Cedex, France, vol. SA WG5, No. Valencia, Spain, Jan. 18, 2010, Jan. 10, 2010, XP050439511, 37 Pages, pp. 13-15.
Samsung: "Discussion on RLC polling", R2-1705683, 3GPP TSG-RAN WG2 Meeting #98, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 14, 2017 (May 14, 2017), XP051275997, 2 Pages.

* cited by examiner

USER EQUIPMENT CAPABILITY SEGMENTATION

FIELD OF THE DISCLOSURE

Aspects of the present disclosure generally relate to wireless communication and to techniques and apparatuses for user equipment capability segmentation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the 3GPP. 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In a 5G standalone (SA)/non-standalone (NSA) architecture system, a UE may transmit an uplink over the air (OTA) message to the network to report UE capabilities supported by the UE (e.g., UE capability information). For example, a UE may transmit UE capability information indicating a set of frequency bands and/or frequency band combinations that can be used for carrier aggregation and/or information identifying a set of features supported by the UE. In some cases, particularly for recent RATs such as 5G, a size of the UE capability information may be greater than a maximum protocol data unit (PDU) size supported by the UE. In these cases, the UE may transmit multiple segments of UE capability information to the network. For example, the UE may support NR dual connectivity (NRDC) frequency band combinations and a size of the UE capability information may approach 100 kb, which may require the UE capability information to be transmitted via multiple (e.g., more than 11) segments.

In some cases, when transmitting the UE capability information via multiple segments, a segment may not be received by the network. The UE may not receive a negative acknowledgement of the undelivered segment until a PDU is transmitted with a poll bit set, which may trigger the network to provide radio link control layer feedback regarding polled PDU(s). Therefore, the UE may transmit a next segment of the UE capability information. The UE may transmit a PDU with a poll bit set and may start a radio link control (RLC) poll retransmission timer. However, the RLC poll retransmission time for signaling bearers may be a relatively high value (e.g., a default value of 45 ms), which may cause further delay in completing the transmission of UE capability information and/or in completion of the overall attachment procedure. This delay may be untenable for certain forms of communication, such as low-latency communications, high priority communications, and so on.

Further, the network may require an initial attach procedure for high priority activity, such as an emergency call, short message service (SMS), and/or the like. When sending multiple segments of UE capability information, the UE may transmit a first segment that includes UE capability information associated with the initial attach procedure and may transmit the remaining portion of the UE capability information via subsequent segments. If the initial segment is not received by the network, the UE may not receive a negative acknowledgement of the undelivered segment until a PDU is transmitted with a poll bit set based on the network's configured parameters and expiration of the RLC poll retransmission timer, as described above, thus causing a delay in the initial attach procedure for the high priority activity.

Some aspects described herein relate to a method of wireless communication performed by a user equipment (UE). The method may include receiving configuration information indicating a configuration for acknowledging UE information, the UE information comprising multiple segments, and the configuration indicating to transmit an indication to jointly acknowledge two or more segments of the UE information. The method may include transmitting, with each segment of the UE information, an indication to separately acknowledge each segment. The method may include detecting a transmission failure for one or more segments of the multiple segments. The method may include retransmitting the one or more segments based at least in part on detecting the transmission failure.

Some aspects described herein relate to a method of wireless communication performed by a user equipment (UE). The method may include receiving a capability enquiry associated with attaching to a network for a priority service. The method may include transmitting, if a baseline set of capability information exceeds a maximum supported size for a single service data unit (SDU), a reduced set of capability information via a single SDU, wherein the reduced set of capability information indicates one or more capabilities associated with the priority service.

Some aspects described herein relate to an apparatus for wireless communication at a user equipment (UE). The apparatus may include a memory. The apparatus may include one or more processors, coupled to the memory, configured to receive configuration information indicating a configuration for acknowledging UE information, the UE information comprising multiple segments, and the configuration indicating to transmit an indication to jointly acknowledge two or more segments of the UE information; transmit, with each segment of the UE information, an indication to separately acknowledge each segment; detect a transmission failure for one or more segments of the multiple segments; and retransmit the one or more segments based at least in part on detecting the transmission failure.

Some aspects described herein relate to an apparatus for wireless communication at an UE. The apparatus may include a memory. The apparatus may include one or more processors, coupled to the memory, configured to receive a capability enquiry associated with attaching to a network for a priority service; and transmit, if a baseline set of capability information exceeds a maximum supported size for a single service data unit (SDU), a reduced set of capability information via a single SDU, where the reduced set of capability information indicates one or more capabilities associated with the priority service.

Some aspects described herein relate to an apparatus for wireless communication. The apparatus may include means for receiving configuration information indicating a configuration for acknowledging user equipment (UE) information, the UE information comprising multiple segments, and the configuration indicating to transmit an indication to jointly acknowledge two or more segments of the UE information. The apparatus may include means for transmitting, with each segment of the UE information, an indication to separately acknowledge each segment. The apparatus may include means for detecting a transmission failure for one or more segments of the multiple segments. The apparatus may include means for retransmitting the one or more segments based at least in part on detecting the transmission failure.

Some aspects described herein relate to an apparatus for wireless communication. The apparatus may include means for receiving a capability enquiry associated with attaching to a network for a priority service. The apparatus may include means for transmitting, if a baseline set of capability information exceeds a maximum supported size for a single service data unit (SDU), a reduced set of capability information via a single SDU, wherein the reduced set of capability information indicates one or more capabilities associated with the priority service.

Some aspects described herein relate to a non-transitory computer-readable medium that stores a set of instructions for wireless communication by a user equipment (UE). The set of instructions, when executed by one or more processors of the UE, may cause the UE to receive configuration information indicating a configuration for acknowledging UE information, the UE information comprising multiple segments, and the configuration indicating to transmit an indication to jointly acknowledge two or more segments of the UE information. The set of instructions, when executed by one or more processors of the UE, may cause the UE to transmit, with each segment of the UE information, an indication to separately acknowledge each segment. The set of instructions, when executed by one or more processors of the UE, may cause the UE to detect a transmission failure for one or more segments of the multiple segments. The set of instructions, when executed by one or more processors of the UE, may cause the UE to retransmit the one or more segments based at least in part on detecting the transmission failure.

Some aspects described herein relate to a non-transitory computer-readable medium that stores a set of instructions for wireless communication by an UE. The set of instructions, when executed by one or more processors of the UE, may cause the UE to receive a capability enquiry associated with attaching to a network for a priority service. The set of instructions, when executed by one or more processors of the UE, may cause the UE to transmit, if a baseline set of capability information exceeds a maximum supported size for a single service data unit (SDU), a reduced set of capability information via a single SDU, wherein the reduced set of capability information indicates one or more capabilities associated with the priority service.

A network may require a UE to transmit UE capability information as part of an overall attachment procedure. The network may allow the UE to transmit the UE capability information via multiple segments. However, the UE may not receive a negative acknowledgement for an undelivered segment until expiration of a poll retransmission timer that is not started by the UE until transmitting a subsequent segment with a poll bit set. The poll retransmission time indicated by the poll retransmission timer may be a relatively high value, which may further increase the delay in the retransmission of the segment and the completion of the overall attachment procedure. Some aspects described herein relate to reducing a delay in the retransmission of undelivered UE information segments, such as segments including UE capability information. For example, when transmitting UE capability information via multiple segments, a UE may request the network to acknowledge each segment and/or may modify a network configured parameter to reduce the delay in retransmitting undelivered segments.

Aspects generally include a method, apparatus, system, computer program product, non-transitory computer-readable medium, user equipment, base station, wireless communication device, and/or processing system as substantially described with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
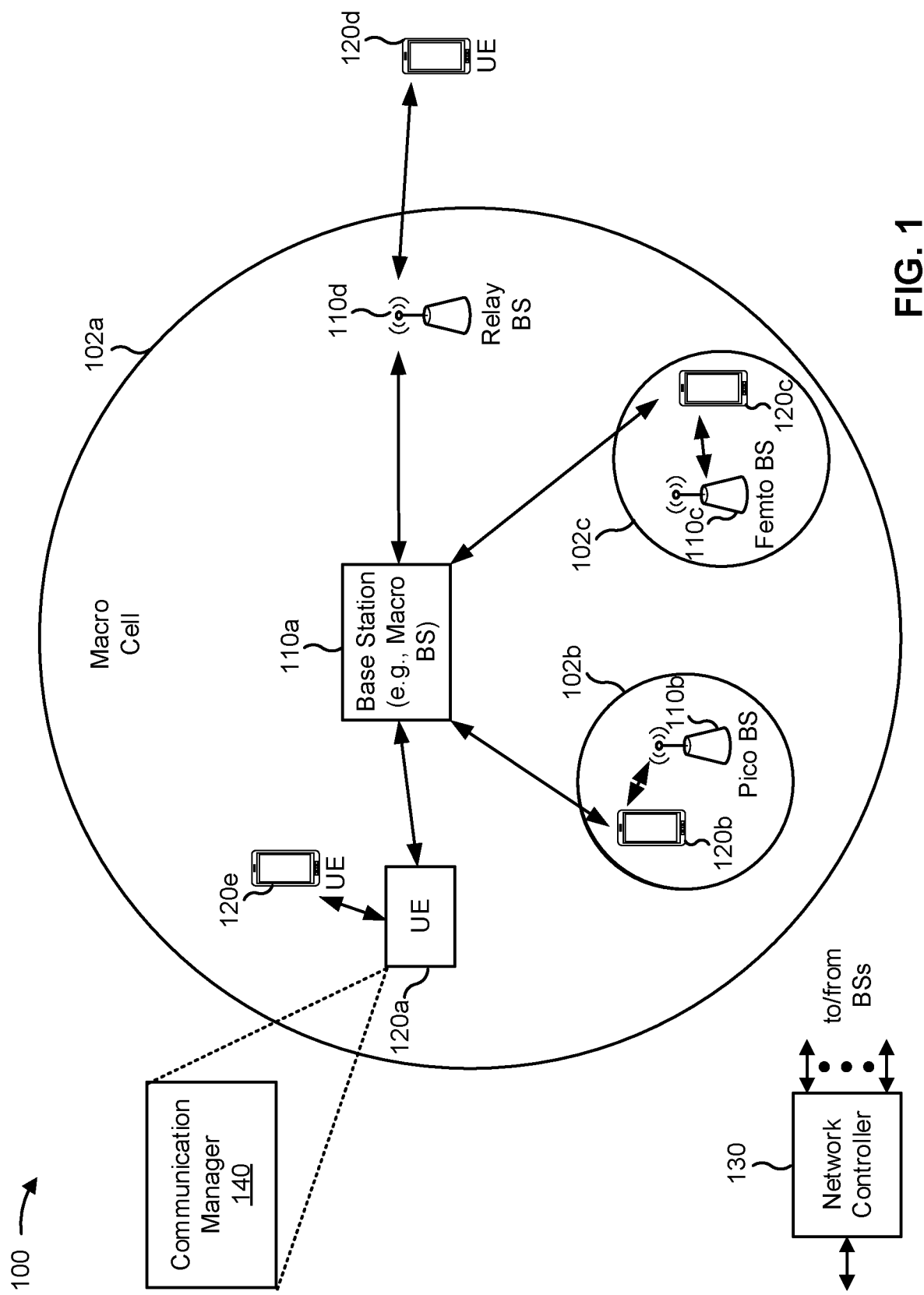
FIG. 1 is diagram illustrating an example of a wireless network, in accordance with the present disclosure.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, or the like.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may transmit UE information (e.g., UE capability information) to the network. Additionally, or alternatively, the communication manager 140 may perform one or more other operations described herein.

As indicated above, FIG. 1 is provided as an example. Other examples may differ from what is described with regard to FIG. 1.

Figure 2:
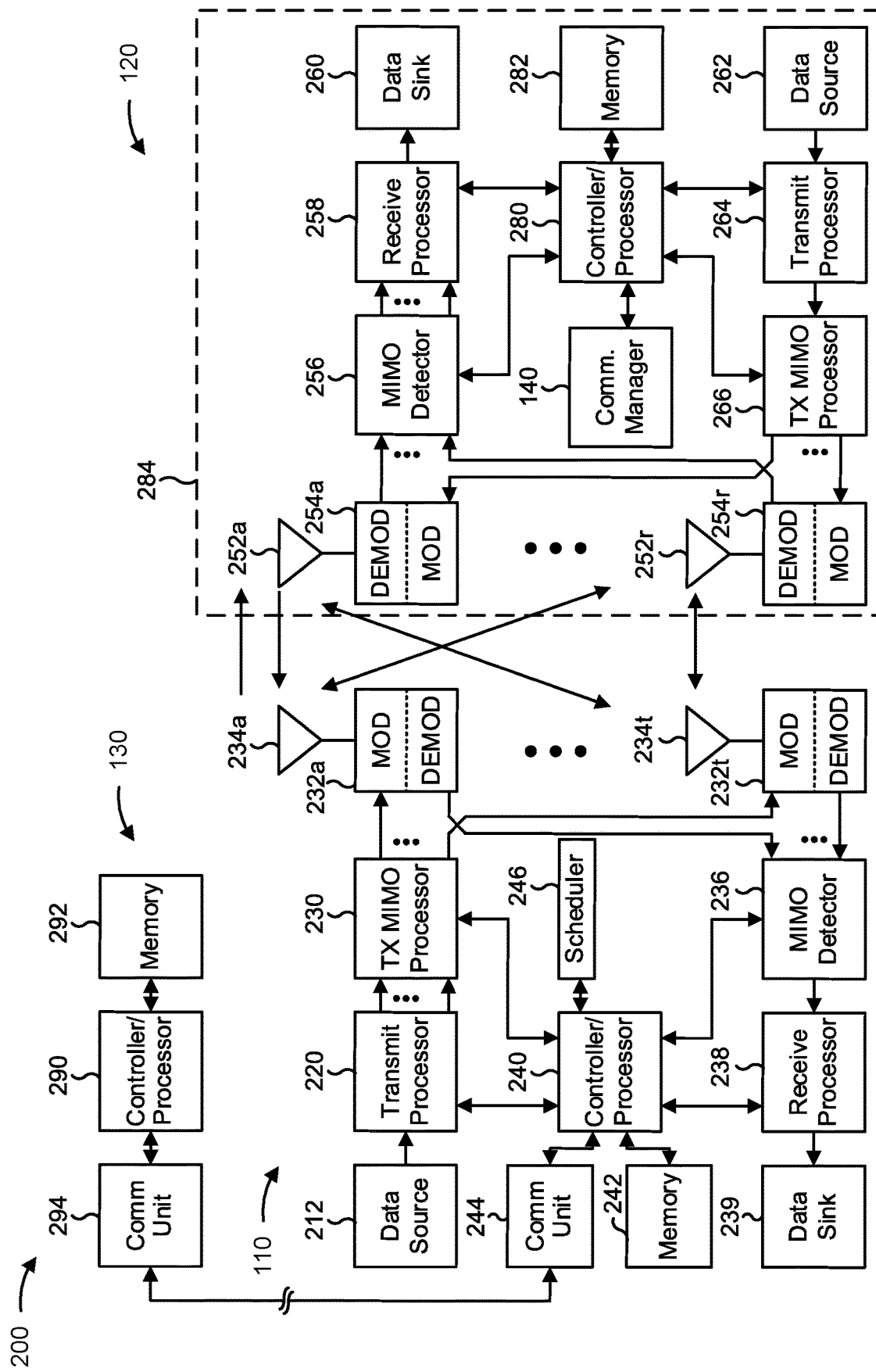
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS), a phase tracking reference signal (PTRS), and/or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein. A scheduler 246 may schedule UEs for data transmission on the downlink and/or uplink.

Controller/processor 240 of base station 110, controller/processor 280 of UE 120, and/or any other component(s) of FIG. 2 may perform one or more techniques associated with UE capability segmentation, as described in more detail elsewhere herein. For example, controller/processor 240 of base station 110, controller/processor 280 of UE 120, and/or any other component(s) of FIG. 2 may perform or direct operations of, for example, method 500 of FIG. 5, method 600 of FIG. 6, and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 500 of FIG. 5, method 600 of FIG. 6, and/or other processes as described herein. In some aspects, executing instructions may include running the instructions, converting the instructions, compiling the instructions, and/or interpreting the instructions, among other examples.

In some aspects, the UE includes means for transmitting, with each segment of UE information having multiple segments, an indication to separately acknowledge each segment; means for receiving feedback for one or more segments of the multiple segments; and/or means for retransmitting the one or more segments if the feedback indicates one or more negative results for the one or more segments. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the UE includes means for receiving a capability enquiry associated with attaching to a network for a priority service; and/or means for transmitting, if a baseline set of capability information exceeds a maximum supported size for a single service data unit (SDU), a reduced set of capability information via a single SDU, wherein the reduced set of capability information indicates one or more capabilities associated with the priority service. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
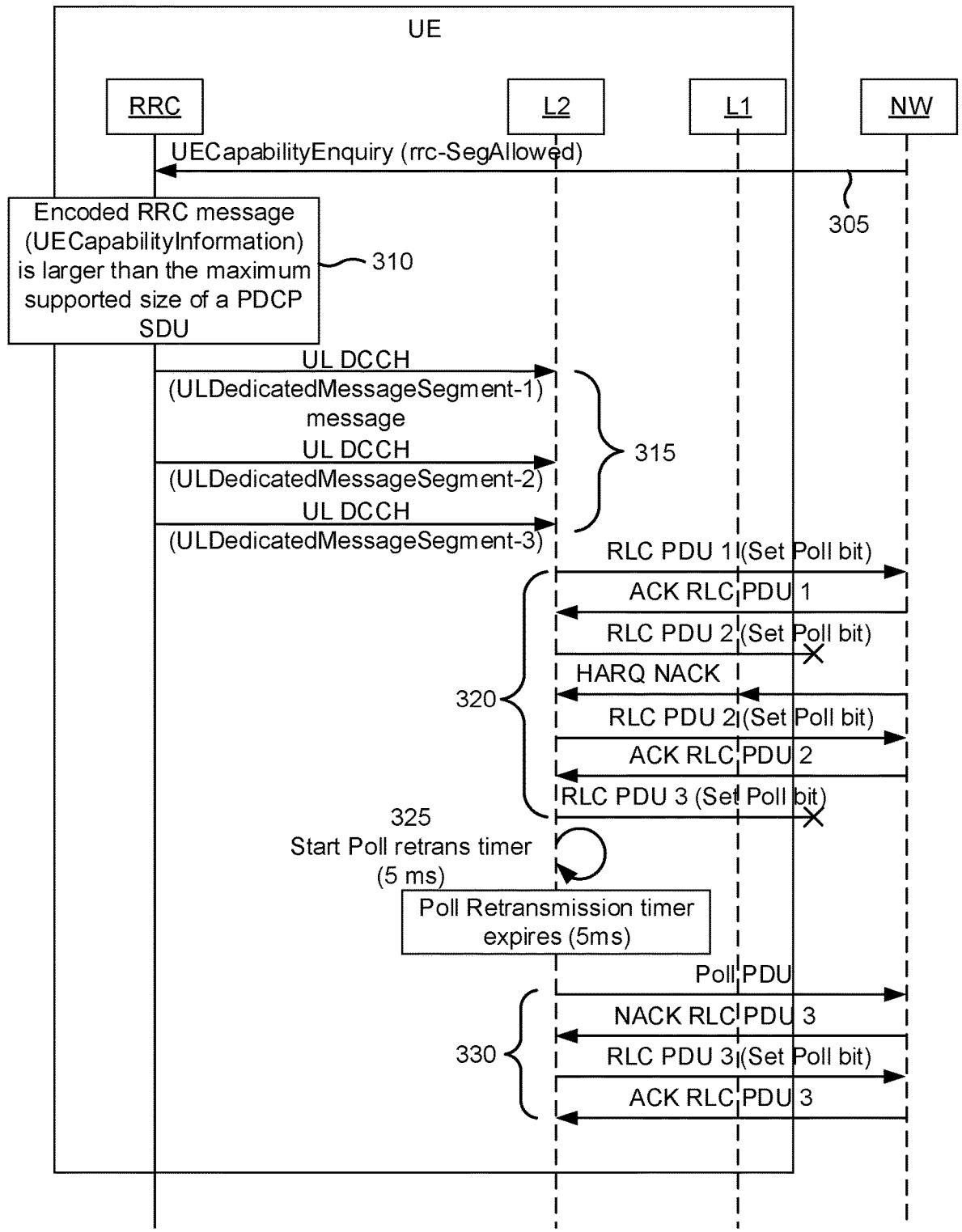
FIGS. 3 and 4 are diagrams illustrating examples associated with user equipment capability segmentation, in accordance with the present disclosure.

FIG. 3 is a diagram illustrating an example 300 associated with UE capability segmentation, in accordance with the present disclosure. As shown in FIG. 3, example 300 includes communication between a network (NW) (e.g., a BS 110) and a UE (e.g., UE 120). In some aspects, the UE may be included in a wireless network, such as wireless network 100. The UE may communicate with the NW via a wireless access link, which may include an uplink and a downlink. As shown, the UE includes a radio resource control (RRC) layer, a Layer 2 (such as an RLC/MAC layer), and a Layer 1 (such as a physical layer). While example 300 is an example relating to segmentation of UE capability information, these techniques can be applied for any type of UE information, such as radio resource control signaling or the like.

At 305, the UE may receive, from the NW, configuration information associated with transmitting UE capability information. For example, as shown in FIG. 3, the UE receives a UE capability enquiry radio resource control (RRC) message from the NW. The UE capability enquiry RRC message may include a request for UE capability information (e.g., UE radio access capabilities for one or more radio access technologies (RATs)) and configuration information associated with the UE transmitting the UE capability information to the NW. In some aspects, as shown in FIG. 3, the configuration information indicates that the UE may transmit the UE capability information via multiple segments.

In some aspects, the configuration may indicate one or more parameters for an RLC acknowledged mode (AM). For example, the one or more parameters may include a poll PDU parameter. The poll PDU parameter may include a PollPDU parameter (indicating a number of PDUs between each poll bit being set, which in this case may be set so that multiple PDUs are transmitted before a PDU including a poll bit is transmitted), a PollByte parameter (indicating a number of bytes of PDU transmissions between each poll bit being set, which in this case may be set so that multiple PDUs are transmitted before a PDU including a poll bit is transmitted), a retransmission timer parameter for an RLC AM, or the like. Thus, the configuration may indicate that the UE is to transmit an indication to jointly acknowledge two or more segments of the UE capability information.

In some aspects, the UE generates an encoded RRC message (e.g., a UE capability information RRC message) that includes the UE capability information for the UE based at least in part on receiving the UE capability enquiry message. The UE may determine a maximum supported size of a packet data convergence protocol (PDCP) service data unit (SDU) based on the configuration information. The UE may determine whether a size of the UE capability information RRC message is greater than the maximum supported size of a PDCP SDU. In some aspects, the UE may determine whether a size of a UE capability information RRC message is greater than the maximum supported size of a PDCP SDU without generating the UE capability information RRC message. For example, the UE may determine that an expected size of the UE capability information RRC message exceeds the maximum supported size of the PDCP SDU. A PDCP SDU is a packet received by the PDCP layer of the UE. For example, a PDCP SDU may include an Internet Protocol (IP) packet. The PDCP layer may process the PDCP SDU (such as by performing header compression and adding a PDCP header) to generate a PDCP PDU for provision to a lower layer.

At 310, the UE determines that the size of the UE capability information RRC message (for example, the expected size or the observed size) is greater than the maximum supported size of a PDCP SDU. The UE may generate multiple segments of UE capability information based at least in part on the UE capability information RRC message being greater than the maximum supported size of a PDCP SDU. For example, as shown in FIG. 3, the UE generates three segments of UE capability information: ULDedicatedMessageSegment-1, ULDedicatedMessageSegment-2, and ULDedicatedMessageSegment-3.

In some aspects, a quantity of segments generated by the UE is based at least in part on the maximum supported size of a PDCP SDU. For example, the UE may determine the quantity of segments based at least in part on dividing the size of the UE capability information RRC message by the maximum supported size of a PDCP SDU.

At 315, the RRC layer of the UE provides the segments to an L2 layer of the UE (that is, the RLC layer of the UE). In some aspects, the UE includes an indication (such as a poll bit) in each segment, or in a respective transmission of each segment as described below. The UE may include the indication in each segment to request the NW to separately acknowledge each segment. For example, the UE may set a poll bit of each segment, as described in greater detail below. Alternatively, or additionally, the UE may modify one or more network configured RLC AM parameters described above (e.g., poll PDU parameter, poll byte parameter, maximum retransmission threshold, and/or the like) to reduce a delay in the retransmission of a segment that is not received by the NW, such as by causing the UE to include the indication in each segment and/or by reducing length of the poll retransmission timer.

At 320, the UE transmits the segments to the NW. In some aspects, each segment of the multiple segments is transmitted in a respective RLC PDU. In some aspects, the indication for each segment comprises a poll bit of the respective RLC PDU. In some aspects, transmitting the indication to separately acknowledge each segment may be in accordance with a poll PDU parameter indicating to transmit the indication with each segment of the multiple segments. The poll PDU parameter may include a PollPDU parameter (indicating a number of PDUs between each poll bit being set, which in this case may be set so that each PDU includes a poll bit), a PollByte parameter (indicating a number of bytes of PDU transmissions between each poll bit being set, which in this case may be set so that each PDU includes a poll bit), or the like. As mentioned above, the poll PDU parameter may be modified relative to a poll PDU parameter indicated by the configuration information at 305.

In some aspects, the UE transmits an initial segment (e.g., RLC PDU 1, as shown) to the NW with poll bit of the initial segment set to trigger feedback regarding the initial segment. The UE may start a poll retransmission timer based on transmitting the initial segment, as described in greater detail below. The UE may receive a positive acknowledgement (e.g., acknowledgement (ACK) RLC PDU 1, as shown) from the NW indicating that the initial segment was received and decoded by the NW. The UE may receive the positive acknowledgement prior to expiration of the poll retransmission timer. Thus, the UE may detect successful transmission of the initial segment.

In some aspects, the UE sets a poll bit of a second segment (e.g., RLC PDU 2, as shown) and transmits the second segment to the NW based at least in part on receiving acknowledgment associated with the initial segment from the NW. The UE may start a poll retransmission timer based at least in part on transmitting the second segment, as described in greater detail below.

As shown, the UE receives a negative acknowledgement (e.g., a hybrid automatic repeat request (HARQ) negative acknowledgement (NACK), as shown) associated with the second segment. The HARQ NACK may be transmitted by a physical layer of the NW and received by L1 of the UE. L1 of the UE may provide the HARQ NACK to L2 of the UE. The UE may receive the HARQ NACK prior to expiration of the poll retransmission timer. The UE may determine that the second segment was not received based at least in part on the HARQ NACK. Thus, by detecting the transmission failure of the second segment using physical-layer (i.e., HARQ) feedback, the UE reduces delay relative to determining that the second segment was not received using higher-layer feedback, such as a failure to receive RLC layer feedback before expiration of the poll retransmission timer associated with the second segment.

The UE may retransmit the second segment to the NW based at least in part on detecting the transmission failure, and may start a poll retransmission timer based at least in part on retransmitting the second segment. Prior to expiration of the poll transmission timer, the UE may receive a positive acknowledgement from the NW associated with the second segment. The UE may set a poll bit of a third segment (e.g., RLC PDU 3, as shown) and may transmit the third segment to the NW based at least in part on receiving the positive acknowledgement.

At 325, the UE sets the poll retransmission timer based on transmitting the third segment to the NW. In some aspects, the poll retransmission timer may be associated with RLC layer feedback. For example, the configuration information may indicate a maximum permitted value, a minimum permitted value, a default value, and/or the like associated with the poll retransmission timer. In some aspects, the poll retransmission timer uses a modified value relative to the value indicated by the configuration information, such as a minimum permitted value for a signaling bearer (e.g., 5 ms), which reduces latency associated with feedback regarding multi-segment communications relative to using a default value or a value indicated by the configuration information, such as 45 ms. As shown in FIG. 3, the UE fails to receive an acknowledgement associated with the third segment within the time period defined by the poll retransmission timer. Thus, the UE may detect a transmission failure for the third segment.

At 330, the UE transmits a poll PDU associated with the third segment to the NW. The NW may receive the poll PDU and may determine that the NW did not receive the third segment. The NW may transmit a negative acknowledgement (e.g., NACK RLC PDU 3, as shown) based at least in part on determining that the NW did not receive the third segment. The UE may receive the negative acknowledgment and may retransmit the third segment based at least in part on receiving the negative acknowledgement. The UE may start the poll retransmission timer based on retransmitting the third segment and may receive a positive acknowledgement associated with the third segment from the NW prior to the expiration of the poll retransmission timer. Thus, latency is reduced, which improves support for high priority and/or low latency communications.

As indicated above, FIG. 3 is provided as an example. Other examples may differ from what is described with respect to FIG. 3.

Figure 4:
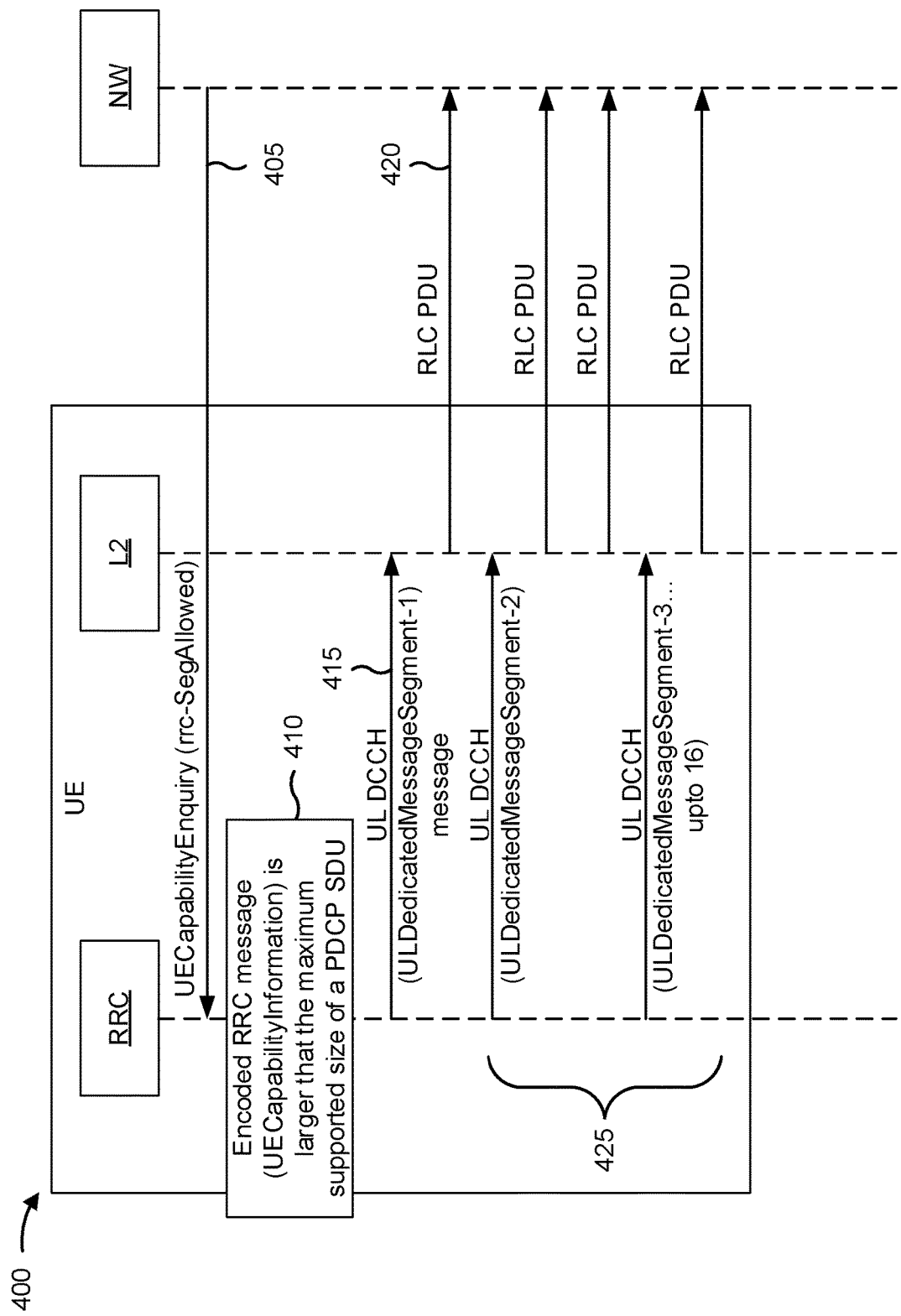

FIG. 4 is a diagram illustrating an example 400 associated with prioritization of UE capability information associated with a high priority service, in accordance with the present disclosure. As shown in FIG. 4, example 400 includes communication between a NW (e.g., BS 110) and a UE (e.g., UE 120). In some aspects, the UE may be included in a wireless network, such as wireless network 100. The UE may communicate with the NW (e.g., BS 110) via a wireless access link, which may include an uplink and a downlink. While example 400 is an example relating to segmentation of UE capability information, these techniques can be applied for any type of UE information.

At 405, the UE may receive a capability enquiry associated with attaching to a network for a priority service. The priority service may be associated with an emergency call, a short message service, or another sort of service. In some aspects, the capability enquiry includes a UE capability enquiry message indicating the UE can transmit UE capability information via multiple segments, in a manner similar to that described above with respect to FIG. 3. The UE may generate an encoded RRC message that includes UE capability information for the UE, in a manner similar to that described above with respect to FIG. 3.

At 410, the UE may determine that a size of the encoded RRC message is larger than a maximum supported size of a PDCP SDU. Alternatively, the UE may determine that an expected size of an encoded RRC message, if generated, would be larger than the maximum supported size of the PDCP SDU. Alternatively, the UE may perform the operations described with regard to FIG. 3 without explicitly determining that the size of the encoded RRC message is larger than the maximum supported size of a PDCP SDU. Thus, the UE may determine to generate multiple segments of UE capability information based on the size of the encoded RRC message being larger than the maximum supported size of a PDCP SDU.

In some aspects, the UE generates an initial segment associated with the priority service. The initial segment may include a reduced set of UE capability information. The reduced set of UE capability information may include UE capability information that is associated with the priority service. For example, the reduced set of UE capability information may include information indicating capabilities, indicated in the encoded RRC message, that are associated with the priority service and may omit or not include capabilities, indicated in the encoded RRC message, that are not associated with the priority service.

At 415, the UE provides the initial segment including the reduced set of capability information to the L2 layer of the UE. Thus, the UE reduces latency associated with signaling capability information for establishment of a connection associated with a high priority service. In some aspects, the UE generates the reduced set of UE capability information to enable the initial segment to have a size less than the maximum supported size of a PDCP SDU and/or to enable the reduced set of UE capability information to be transmitted via a single SDU. The UE may transmit the initial segment to the NW based on the initial segment being provided to the L2 layer. In some aspects, the UE transmits the initial segment to the NW in a manner similar to that described above with respect to FIG. 3. In some aspects, the NW may commence setup or continue connection configuration using the initial segment, such as before or while additional segments are received.

At 425, in some aspects, the UE may generate one or more other segments that include information indicating the capabilities of the UE that are not associated with the priority service. The UE may provide the one or more other segments to the L2 layer of the UE and may transmit the one or more other segments to the NW in a manner similar to that described above with respect to FIG. 3. In some aspects, the UE provides the one or more other segments to the L2 layer and/or transmits the one or more other segments to the NW based on receiving, from the NW, the positive acknowledgement associated with the initial segment. In this way, the UE may reduce a delay in the initial attach procedure for high priority activity.

As indicated above, FIG. 4 is provided as an example. Other examples may differ from what is described with respect to FIG. 4.

Figure 5:
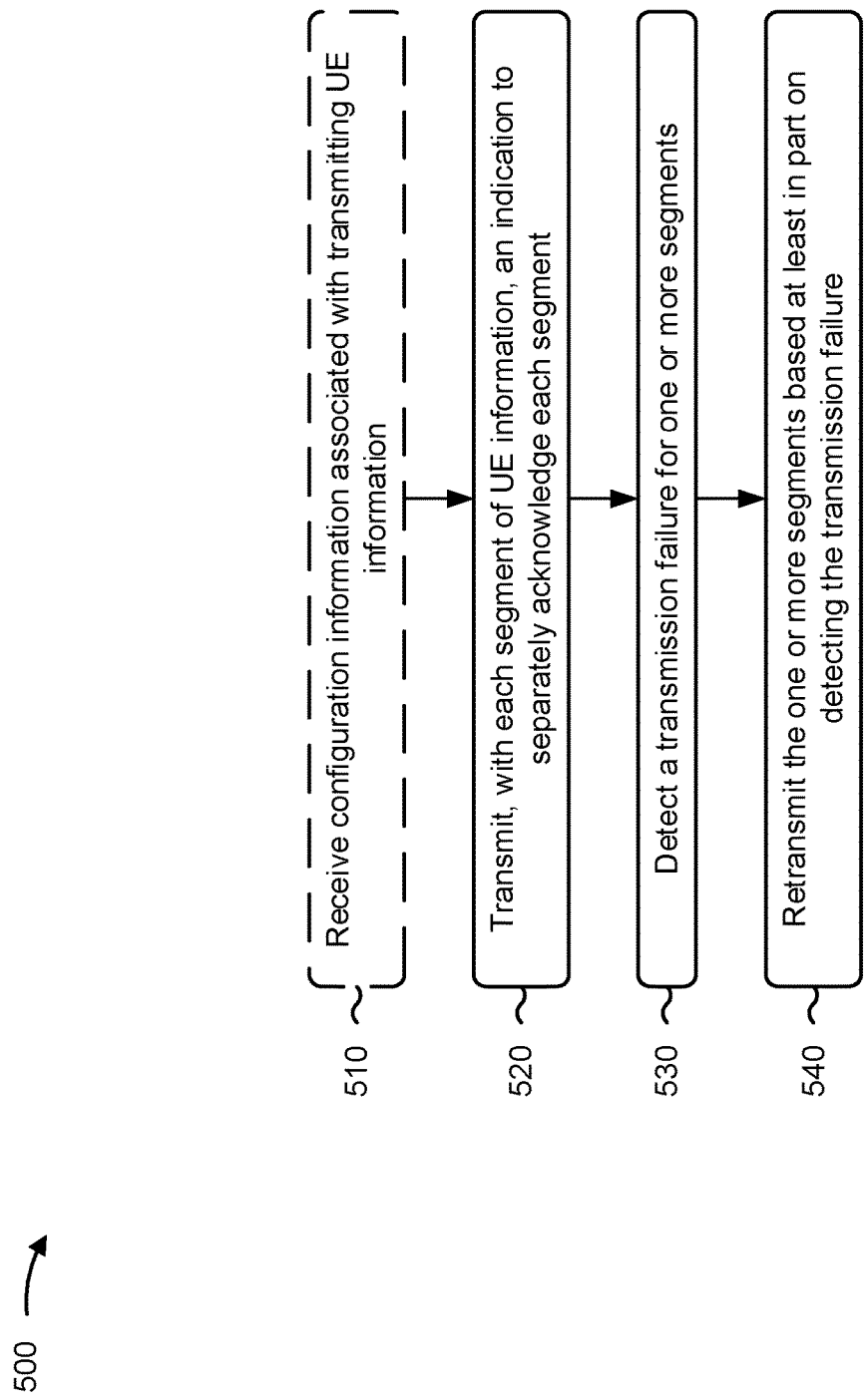
FIGS. 5 and 6 are flowcharts of example methods of wireless communication, in accordance with the present disclosure.

FIG. 5 is a flowchart of an example method 500 of wireless communication. The method 500 may be performed by, for example, a UE (e.g., UE 120).

At 510, the UE may receive configuration information associated with transmitting UE information. For example, the UE (e.g., using communication manager 140 and/or reception component 702, depicted in FIG. 7) may receive configuration information associated with transmitting UE information, as described above in connection with, for example, FIG. 3 and at 305. In some aspects, the configuration information may indicate a configuration for acknowledging UE information. For example, the UE information may comprise multiple segments, and the configuration may indicate to transmit an indication (e.g., an acknowledgment/negative acknowledgment) to jointly acknowledge two or more segments of the UE information.

At 520, the UE may transmit, with each segment of UE information, an indication to separately acknowledge each segment. For example, the UE (e.g., using communication manager 140 and/or transmission component 704, depicted in FIG. 7) may transmit, with each segment of UE information having multiple segments, an indication to separately acknowledge each segment, as described above in connection with, for example, FIG. 3 and at 320. In some aspects, the UE information includes UE capability information for the UE. In some aspects, each segment of the multiple segments is transmitted in a respective RLC PDU. In some aspects, the indication for each segment comprises a poll bit of the respective RLC PDU. In some aspects, transmitting the indication to separately acknowledge each segment is in accordance with a poll PDU parameter indicating to transmit the indication with each segment of the multiple segments.

At 530, the UE may detect a transmission failure for one or more segments of the multiple segments. For example, the UE (e.g., using communication manager 140 and/or reception component 702, depicted in FIG. 7) may detect a transmission failure for one or more segments of each segment transmitted by the UE. In some aspects, the UE may receive feedback for one or more segments of the multiple segments, and may detect the transmission failure based at least in part on the feedback, as described above in connection with, for example, FIG. 3 and at 325. In some aspects, the feedback is HARQ feedback.

At 540, the UE may retransmit the one or more segments based at least in part on detecting the transmission failure. For example, the UE (e.g., using communication manager 140 and/or transmission component 704, depicted in FIG. 7) may retransmit the one or more segments based at least in part on detecting the transmission failure, as described above in connection with, for example, FIG. 3 and at 320. In some aspects, retransmitting the one or more segments is based at least in part on a poll retransmission timer that is shorter than a default poll retransmission timer for a signaling bearer. In some aspects, the poll retransmission timer uses a minimum permitted value for poll retransmission timers. In some aspects, the feedback is HARQ feedback and the retransmission may be triggered prior to expiration of a poll retransmission timer associated with RLC layer feedback.

Although FIG. 5 shows example blocks of method 500, in some aspects, method 500 may include additional blocks, fewer blocks, different blocks, or differently arranged blocks than those depicted in FIG. 5. Additionally, or alternatively, two or more of the blocks of method 500 may be performed in parallel.

Figure 6:
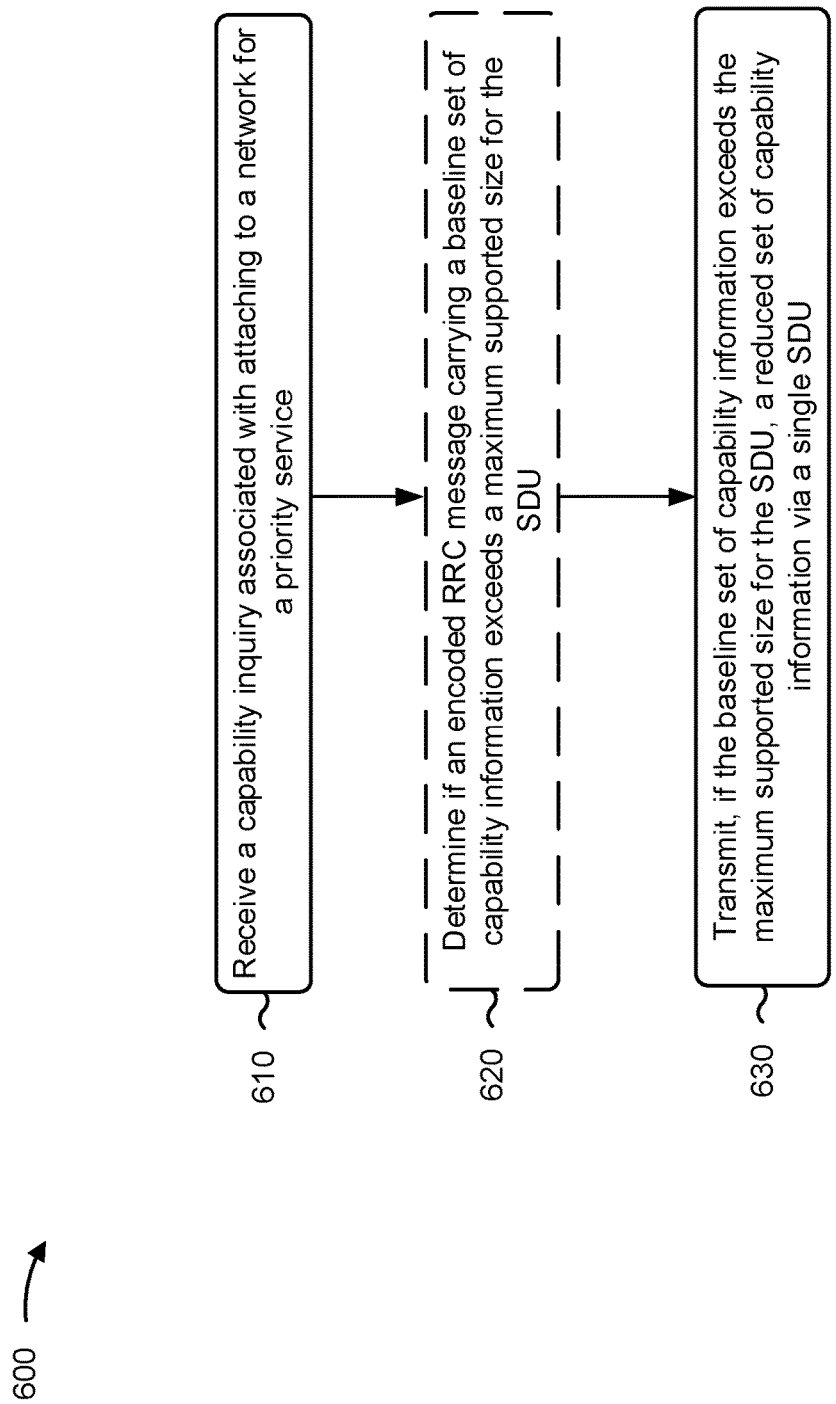

FIG. 6 is a flowchart of an example method 600 of wireless communication. The method 600 may be performed by, for example, a UE (e.g., UE 120).

At 610, the UE may receive a capability enquiry associated with attaching to a network for a priority service. For example, the UE (e.g., using communication manager 140 and/or reception component 902, depicted in FIG. 9) may receive a capability enquiry associated with attaching to a network for a priority service, as described above in connection with, for example, FIG. 4 and at 405. In some aspects, the capability enquiry indicates that transmission of the baseline set of capability information via multiple SDUs is allowed. In some aspects, the priority service is associated with an emergency call. In some aspects, the priority service is associated with a short message service.

At 620, the UE may determine if an encoded RRC message carrying a baseline set of capability information exceeds a maximum supported size for the SDU. For example, the UE (e.g., using communication manager 140 and/or transmission component 904, depicted in FIG. 9) may determine if an encoded RRC message carrying a baseline set of capability information exceeds a maximum supported size for the SDU, as described above in connection with, for example, FIG. 4 and at 410.

At 630, the UE may transmit, if a baseline set of capability information exceeds a maximum supported size for the single SDU, a reduced set of capability information via a single SDU. For example, the UE (e.g., using communication manager 140 and/or transmission component 904, depicted in FIG. 9) may transmit, if the baseline set of capability information exceeds the maximum supported size for a single SDU, a reduced set of capability information via a single SDU, as described above in connection with, for example, FIG. 4 and at 420. In some aspects, the reduced set of capability information may indicate one or more capabilities associated with the priority service. In some aspects, the reduced set of capability information omits one or more capabilities, of the baseline set of capability information, that are not associated with the priority service.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

Figure 7:
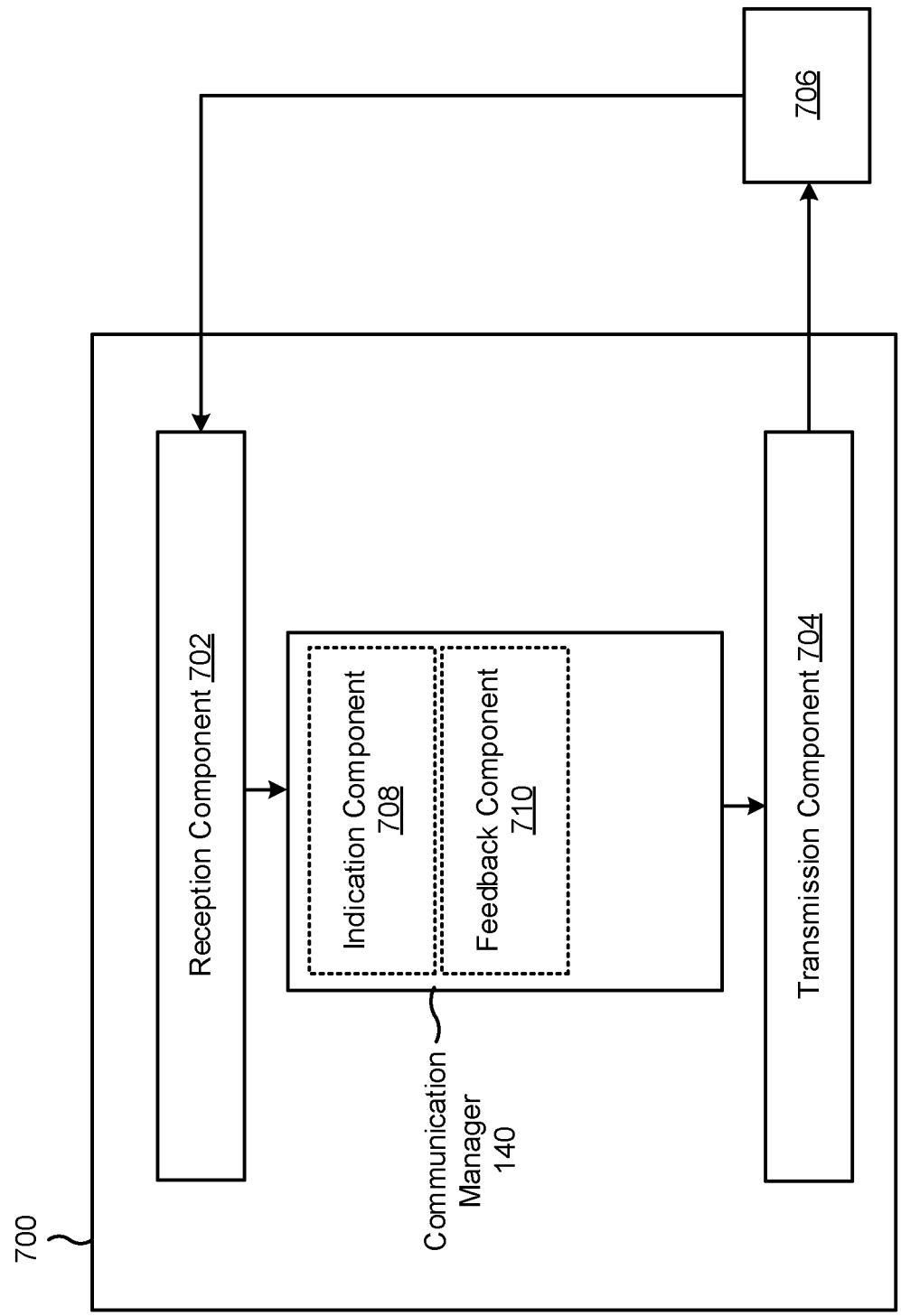
FIGS. 7 and 9 block diagrams of an example apparatus for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of an indication component 708 or a feedback component 710, among other examples.

In some aspects, the apparatus 700 may be configured to perform one or more operations described herein in connection with FIGS. 3 and 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive configuration information indicating to transmit the indication to separately acknowledge each segment. The indication component 708 may cause the transmission component 704 to transmit, with each segment of UE information having multiple segments, an indication to separately acknowledge each segment. The reception component 702 may receive feedback for one or more segments of the multiple segments. The feedback component 710 may cause the transmission component 704 to retransmit the one or more segments if the feedback indicates one or more negative results for the one or more segments.

The number and arrangement of components shown in FIG. 7 are provided as an example. In practice, there may be additional components, fewer components, different components, or differently arranged components than those shown in FIG. 7.

Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
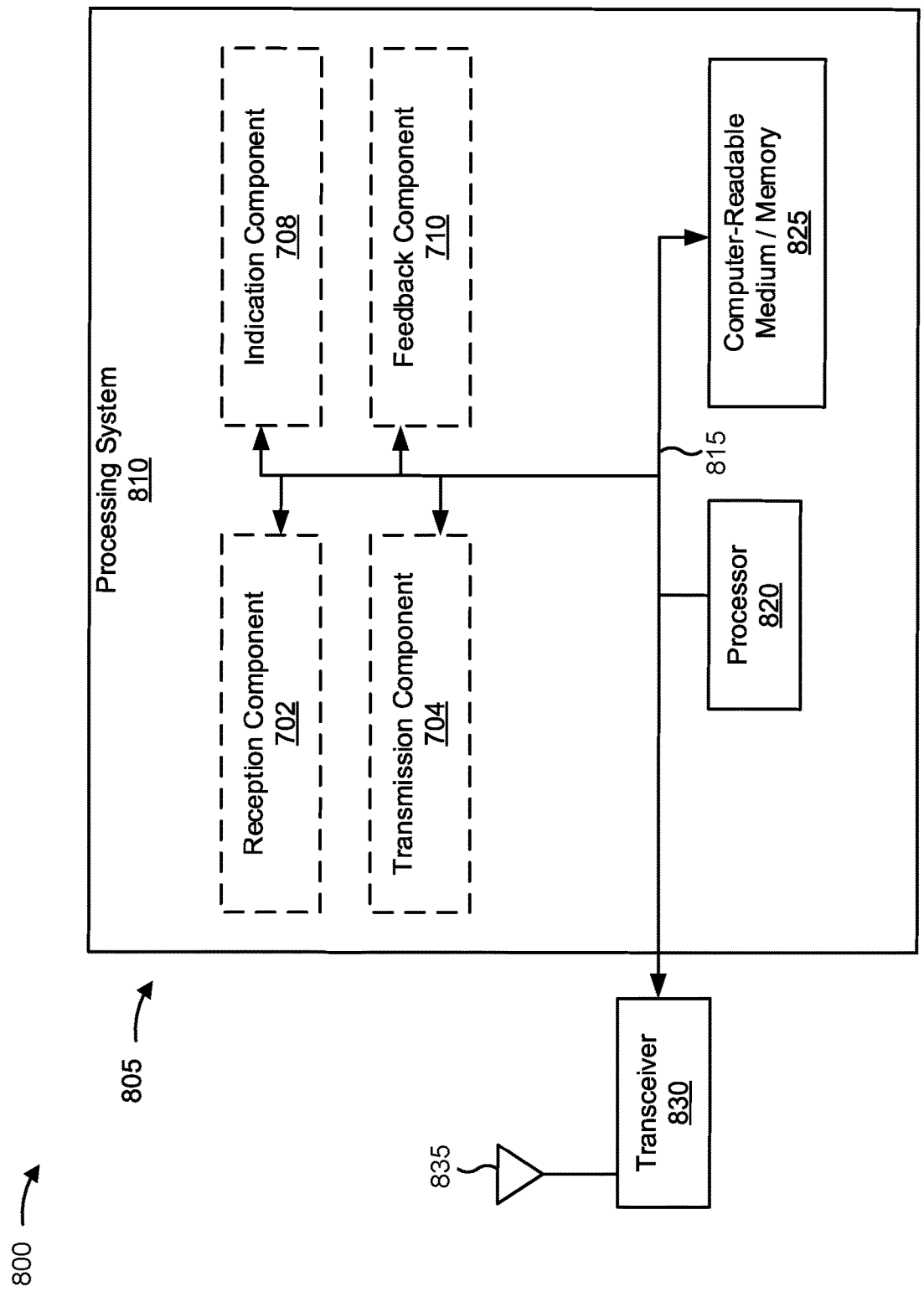
FIGS. 8 and 10 diagrams illustrating an example of a hardware implementation for an apparatus employing a processing system, in accordance with the present disclosure.

FIG. 8 is a diagram illustrating an example 800 of a hardware implementation for an apparatus 805 employing a processing system 810. The apparatus 805 may be a UE.

The processing system 810 may be implemented with a bus architecture, represented generally by the bus 815. The bus 815 may include any number of interconnecting buses and bridges depending on the specific application of the processing system 810 and the overall design constraints. The bus 815 links together various circuits including one or more processors and/or hardware components, represented by the processor 820, the illustrated components, and the computer-readable medium/memory 825. The bus 815 may also link various other circuits, such as timing sources, peripherals, voltage regulators, and/or power management circuits.

The processing system 810 may be coupled to a transceiver 830. The transceiver 830 is coupled to one or more antennas 835. The transceiver 830 provides a means for communicating with various other apparatuses over a transmission medium. The transceiver 830 receives a signal from the one or more antennas 835, extracts information from the received signal, and provides the extracted information to the processing system 810, specifically the reception component 702. In addition, the transceiver 830 receives information from the processing system 810, specifically the transmission component 704, and generates a signal to be applied to the one or more antennas 835 based at least in part on the received information.

The processing system 810 includes a processor 820 coupled to a computer-readable medium/memory 825. The processor 820 is responsible for general processing, including the execution of software stored on the computer-readable medium/memory 825. The software, when executed by the processor 820, causes the processing system 810 to perform the various functions described herein for any particular apparatus. The computer-readable medium/memory 825 may also be used for storing data that is manipulated by the processor 820 when executing software. The processing system further includes at least one of the illustrated components. The components may be software modules running in the processor 820, resident/stored in the computer readable medium/memory 825, one or more hardware modules coupled to the processor 820, or some combination thereof.

In some aspects, the processing system 810 may be a component of the UE 120 and may include the memory 282 and/or at least one of the TX MIMO processor 266, the RX processor 258, and/or the controller/processor 280. In some aspects, the apparatus 805 for wireless communication includes means for transmitting, with each segment of capability information having multiple segments, an indication to separately acknowledge each segment; means for receiving feedback for one or more segments of the multiple segments; and means for retransmitting the one or more segments if the feedback indicates one or more negative results for the one or more segments. The aforementioned means may be one or more of the aforementioned components of the apparatus 700 and/or the processing system 810 of the apparatus 805 configured to perform the functions recited by the aforementioned means. As described elsewhere herein, the processing system 810 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 8 is provided as an example. Other examples may differ from what is described in connection with FIG. 8.

Figure 9:
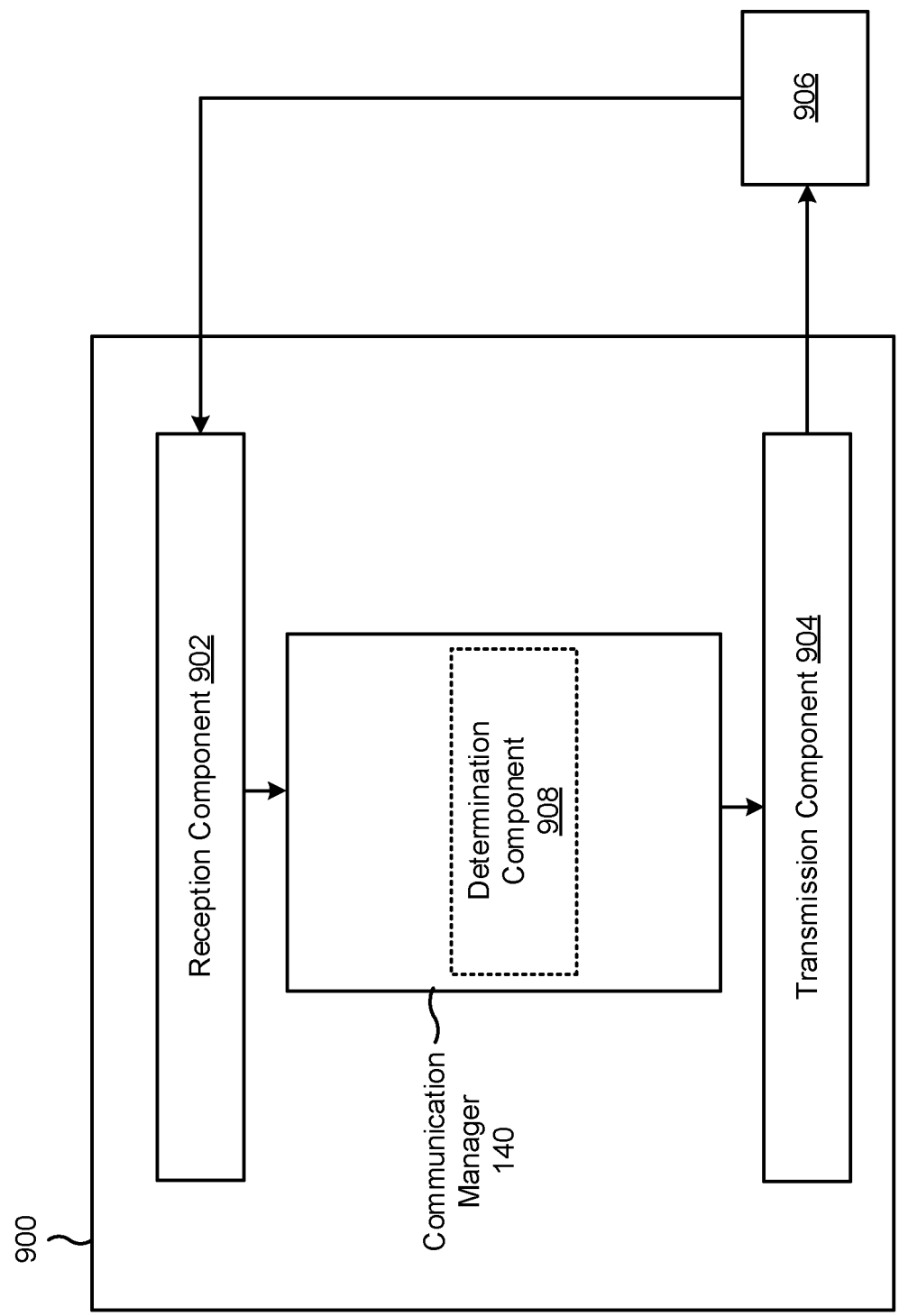

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908, among other examples.

In some aspects, the apparatus 900 may be configured to perform one or more operations described herein in connection with FIGS. 3 and 4. Additionally, or alternatively, the apparatus 900 may be configured to perform one or more processes described herein, such as process 500 of FIG. 5, process 600 of FIG. 6, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive a capability enquiry associated with attaching to a network for a priority service. The determination component 908 may determine whether an encoded RRC message carrying the baseline set of capability information exceeds the maximum supported size for the single SDU. The transmission component 904 may transmit, if a baseline set of capability information exceeds the maximum supported size for the single SDU, a reduced set of capability information via a single SDU. The transmission component 904 may transmit the reduced set of capability information via the single SDU based at least in part on the encoded RRC message exceeding the maximum supported size for the single SDU. The reduced set of capability information may indicate one or more capabilities associated with the priority service.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
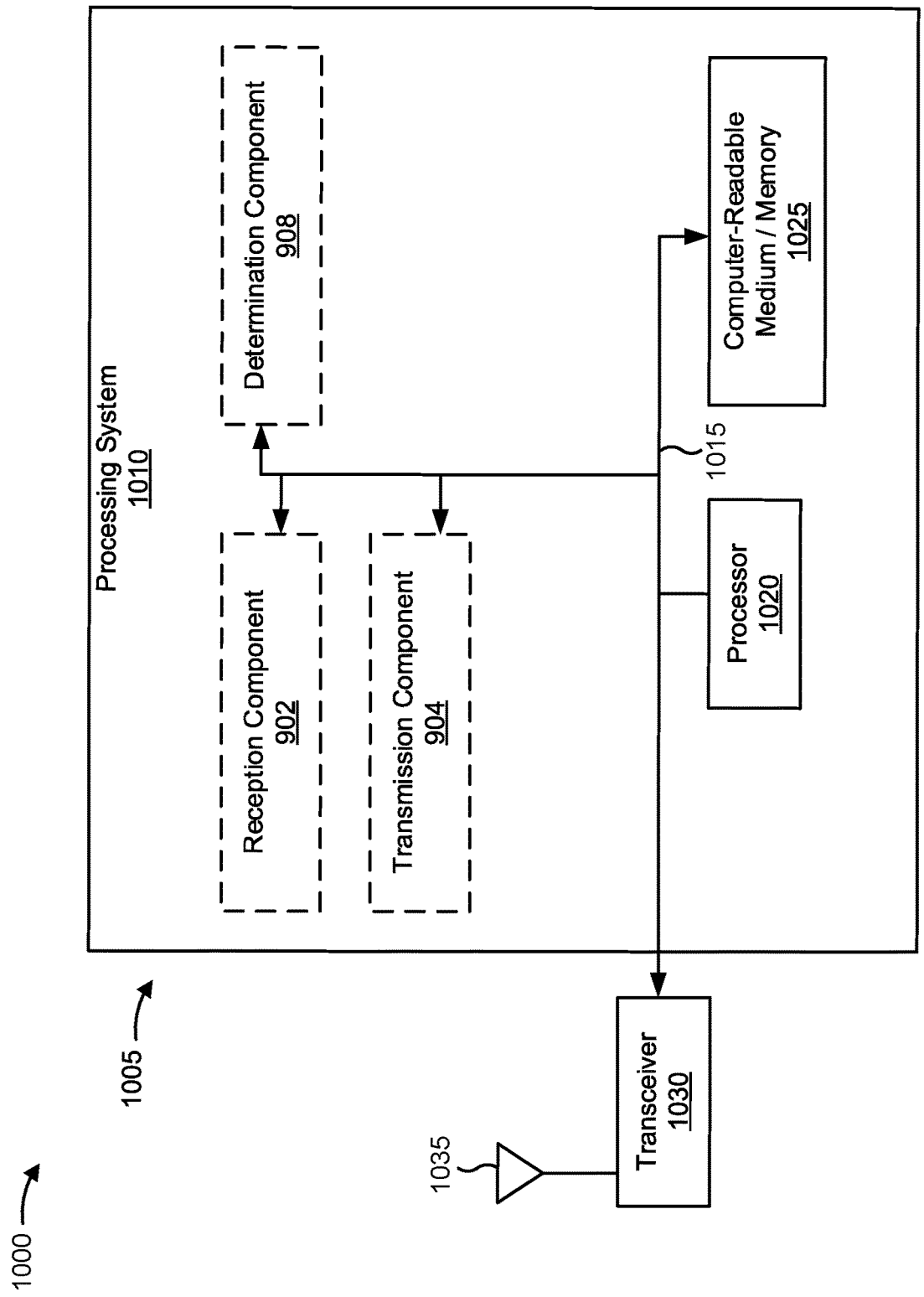

FIG. 10 is a diagram illustrating an example 1000 of a hardware implementation for an apparatus 1005 employing a processing system 1010. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, and/or power management circuits.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for receiving a capability enquiry associated with attaching to a network for a priority service; and means for transmitting, if a baseline set of capability information exceeds a maximum supported size for a single SDU, a reduced set of capability information via a single SDU, wherein the reduced set of capability information indicates one or more capabilities associated with the priority service. The aforementioned means may be one or more of the aforementioned components of the apparatus 900 and/or the processing system 1010 of the apparatus 1005 configured to perform the functions recited by the aforementioned means.

As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

The following provides an overview of some Aspects of the present disclosure:

Aspect 1: A method of wireless communication performed by a user equipment (UE), comprising: receiving configuration information indicating a configuration for acknowledging UE information, the UE information comprising multiple segments, and the configuration indicating to transmit an indication to jointly acknowledge two or more segments of the UE information; transmitting, with each segment of the UE information, an indication to separately acknowledge each segment; detecting a transmission failure for one or more segments of the multiple segments; and retransmitting the one or more segments based at least in part on detecting the transmission failure.

Aspect 2: The method of Aspect 1, wherein the configuration indicates a default poll retransmission timer for a signaling bearer, wherein the UE information includes capability information, and wherein retransmitting the one or more segments is based at least in part on a poll retransmission timer that is shorter than the default poll retransmission timer.

Aspect 3: The method of Aspect 2, wherein the poll retransmission timer uses a minimum permitted value for poll retransmission timers.

Aspect 4: The method of Aspect 2, wherein detecting the transmission failure is based at least in part on the poll retransmission timer expiring without receipt of an acknowledgment regarding the one or more segments.

Aspect 5: The method of Aspect 2, wherein the poll retransmission timer is shorter than a length of time between transmission of two segments of the multiple segments.

Aspect 6: The method of any of Aspects 1-5, wherein each segment of the multiple segments is transmitted in a respective radio link control protocol data unit (PDU), and wherein the indication for each segment comprises a poll bit of the respective radio link control PDU.

Aspect 7: The method of any of Aspects 1-6, wherein a poll PDU parameter of the configuration indicates to transmit the indication to jointly acknowledge two or more segments of the UE information, and wherein transmitting the indication to separately acknowledge each segment is in accordance with a modified poll PDU parameter indicating to transmit the indication with each segment of the multiple segments.

Aspect 8: The method of any of Aspects 1-7, wherein detecting the transmission failure is based at least in part on hybrid automatic repeat request (HARD) feedback regarding the one or more segments, and wherein the retransmission is triggered by the HARQ feedback prior to expiration of a poll retransmission timer associated with radio link control layer feedback.

Aspect 9: The method of any of Aspects 1-8, wherein transmitting, with each segment of the UE information, the indication to separately acknowledge each segment is based at least in part on at least one of: the UE being associated with a poor coverage condition, the UE being in a multiple subscriber identity module mode, or the UE information comprising the multiple segments.

Aspect 10: A method of wireless communication performed by a user equipment (UE), comprising: receiving a capability enquiry associated with attaching to a network for a priority service; and transmitting, if a baseline set of capability information exceeds a maximum supported size for a single service data unit (SDU), a reduced set of capability information via a single SDU, wherein the reduced set of capability information indicates one or more capabilities associated with the priority service.

Aspect 11: The method of Aspect 10, wherein the capability enquiry indicates that transmission of the baseline set of capability information via multiple SDUs is allowed, and wherein an attach time associated with the priority service is reduced by transmitting the reduced set of capability information via the single SDU as compared to transmitting the baseline set of capability information via multiple SDUs.

Aspect 12: The method of any of Aspects 10-11, wherein the reduced set of capability information omits one or more capabilities, of the baseline set of capability information, that are not associated with the priority service.

Aspect 13: The method of any of Aspects 10-12, wherein the priority service is associated with an emergency call.

Aspect 14: The method of any of Aspects 10-13, wherein the priority service is associated with a short message service.

Aspect 15: The method of any of Aspects 10-14, further comprising: determining that an encoded radio resource control message carrying the baseline set of capability information exceeds the maximum supported size for the single SDU, wherein transmitting the reduced set of capability information via the single SDU is based at least in part on the encoded radio resource control message exceeding the maximum supported size for the single SDU.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive configuration information indicating a configuration for acknowledging UE information,
         the UE information comprising multiple segments,
         the configuration indicating to transmit an indication to jointly acknowledge two or more segments of the UE information, and
         the configuration indicating a default poll retransmission timer for a signaling bearer;
      transmit, with each segment of the UE information, an indication to separately acknowledge each segment;

detect a transmission failure for one or more segments of the multiple segments; and
retransmit the one or more segments based at least in part on detecting the transmission failure and based at least in part on a poll retransmission timer that is shorter than the default poll retransmission timer,
wherein the poll retransmission timer uses a minimum permitted value for poll retransmission timers.

2. The apparatus of claim 1, wherein the UE information includes capability information.

3. The apparatus of claim 1, wherein detecting the transmission failure is based at least in part on the poll retransmission timer expiring without receipt of an acknowledgment regarding the one or more segments.

4. The apparatus of claim 1, wherein the poll retransmission timer is shorter than a length of time between transmission of two segments of the multiple segments.

5. The apparatus of claim 1, wherein each segment of the multiple segments is transmitted in a respective radio link control protocol data unit (PDU), and wherein the indication for each segment comprises a poll bit of the respective radio link control PDU.

6. The apparatus of claim 1, wherein a poll PDU parameter of the configuration indicates to transmit the indication to jointly acknowledge two or more segments of the UE information, and wherein transmitting the indication to separately acknowledge each segment is in accordance with a modified poll PDU parameter indicating to transmit the indication with each segment of the multiple segments.

7. The apparatus of claim 1, wherein detecting the transmission failure is based at least in part on hybrid automatic repeat request (HARQ) feedback regarding the one or more segments, and wherein the retransmission is triggered by the HARQ feedback prior to expiration of a poll retransmission timer associated with radio link control layer feedback.

8. The apparatus of claim 1, wherein transmitting, with each segment of the UE information, the indication to separately acknowledge each segment is based at least in part on at least one of:
the UE being associated with a poor coverage condition,
the UE being in a multiple subscriber identity module mode, or
the UE information comprising the multiple segments.

9. A method of wireless communication performed by a user equipment (UE), comprising:
receiving configuration information indicating a configuration for acknowledging UE information,
the UE information comprising multiple segments,
the configuration indicating to transmit an indication to jointly acknowledge two or more segments of the UE information, and
the configuration indicating a default poll retransmission timer for a signaling bearer;
transmitting, with each segment of the UE information, an indication to separately acknowledge each segment;
detecting a transmission failure for one or more segments of the multiple segments; and
retransmitting the one or more segments based at least in part on detecting the transmission failure and based at least in part on a poll retransmission timer that is shorter than the default poll retransmission timer,
wherein the poll retransmission timer uses a minimum permitted value for poll retransmission timers.

10. The method of claim 9, wherein the UE information includes capability information.

11. The method of claim 9, wherein detecting the transmission failure is based at least in part on the poll retransmission timer expiring without receipt of an acknowledgment regarding the one or more segments.

12. The method of claim 9, wherein the poll retransmission timer is shorter than a length of time between transmission of two segments of the multiple segments.

13. The method of claim 9, wherein each segment of the multiple segments is transmitted in a respective radio link control protocol data unit (PDU), and wherein the indication for each segment comprises a poll bit of the respective radio link control PDU.

14. The method of claim 9, wherein a poll PDU parameter of the configuration indicates to transmit the indication to jointly acknowledge two or more segments of the UE information, and wherein transmitting the indication to separately acknowledge each segment is in accordance with a modified poll PDU parameter indicating to transmit the indication with each segment of the multiple segments.

15. The method of claim 9, wherein detecting the transmission failure is based at least in part on hybrid automatic repeat request (HARQ) feedback regarding the one or more segments, and wherein the retransmission is triggered by the HARQ feedback prior to expiration of a poll retransmission timer associated with radio link control layer feedback.

16. The method of claim 9, wherein transmitting, with each segment of the UE information, the indication to separately acknowledge each segment is based at least in part on at least one of:
the UE being associated with a poor coverage condition,
the UE being in a multiple subscriber identity module mode, or
the UE information comprising the multiple segments.

17. A non-transitory computer-readable medium storing a set of instructions for wireless communication, the set of instructions comprising:
one or more instructions that, when executed by one or more processors of a user equipment (UE), cause the UE to:
receive configuration information indicating a configuration for acknowledging UE information,
the UE information comprising multiple segments,
the configuration indicating to transmit an indication to jointly acknowledge two or more segments of the UE information, and
the configuration indicating a default poll retransmission timer for a signaling bearer;
transmit, with each segment of the UE information, an indication to separately acknowledge each segment;
detect a transmission failure for one or more segments of the multiple segments; and
retransmit the one or more segments based at least in part on detecting the transmission failure and based at least in part on a poll retransmission timer that is shorter than the default poll retransmission timer,
wherein the poll retransmission timer uses a minimum permitted value for poll retransmission timers.

18. The non-transitory computer-readable medium of claim 17, wherein the UE information includes capability information.

19. The non-transitory computer-readable medium of claim 17, wherein detecting the transmission failure is based at least in part on the poll retransmission timer expiring without receipt of an acknowledgment regarding the one or more segments.

20. The non-transitory computer-readable medium of claim 17, wherein the poll retransmission timer is shorter than a length of time between transmission of two segments of the multiple segments.

21. An apparatus for wireless communication at a user equipment (UE), comprising:
   means for receiving configuration information indicating a configuration for acknowledging UE information, the UE information comprising multiple segments,
      the configuration indicating to transmit an indication to jointly acknowledge two or more segments of the UE information, and
      the configuration indicating a default poll retransmission timer for a signaling bearer;
   means for transmitting, with each segment of the UE information, an indication to separately acknowledge each segment;
   means for detecting a transmission failure for one or more segments of the multiple segments; and
   means for retransmitting the one or more segments based at least in part on detecting the transmission failure and based at least in part on a poll retransmission timer that is shorter than the default poll retransmission timer,
      wherein the poll retransmission timer uses a minimum permitted value for poll retransmission timers.

22. The apparatus of claim 21, wherein the UE information includes capability information.

23. The apparatus of claim 21, wherein detecting the transmission failure is based at least in part on the poll retransmission timer expiring without receipt of an acknowledgment regarding the one or more segments.

24. The apparatus of claim 21, wherein the poll retransmission timer is shorter than a length of time between transmission of two segments of the multiple segments.

25. The apparatus of claim 21, wherein each segment of the multiple segments is transmitted in a respective radio link control protocol data unit (PDU), and wherein the indication for each segment comprises a poll bit of the respective radio link control PDU.

26. The apparatus of claim 21, wherein a poll PDU parameter of the configuration indicates to transmit the indication to jointly acknowledge two or more segments of the UE information, and wherein transmitting the indication to separately acknowledge each segment is in accordance with a modified poll PDU parameter indicating to transmit the indication with each segment of the multiple segments.

27. The apparatus of claim 21, wherein detecting the transmission failure is based at least in part on hybrid automatic repeat request (HARQ) feedback regarding the one or more segments, and wherein the retransmission is triggered by the HARQ feedback prior to expiration of a poll retransmission timer associated with radio link control layer feedback.

28. The apparatus of claim 21, wherein transmitting, with each segment of the UE information, the indication to separately acknowledge each segment is based at least in part on at least one of:
   the UE being associated with a poor coverage condition,
   the UE being in a multiple subscriber identity module mode, or
   the UE information comprising the multiple segments.

\* \* \* \* \*